F. T. COPE
Nov. 29, 1932. HEAT TREATING FURNACE Re. 18,668
Original Filed Oct. 3, 1929
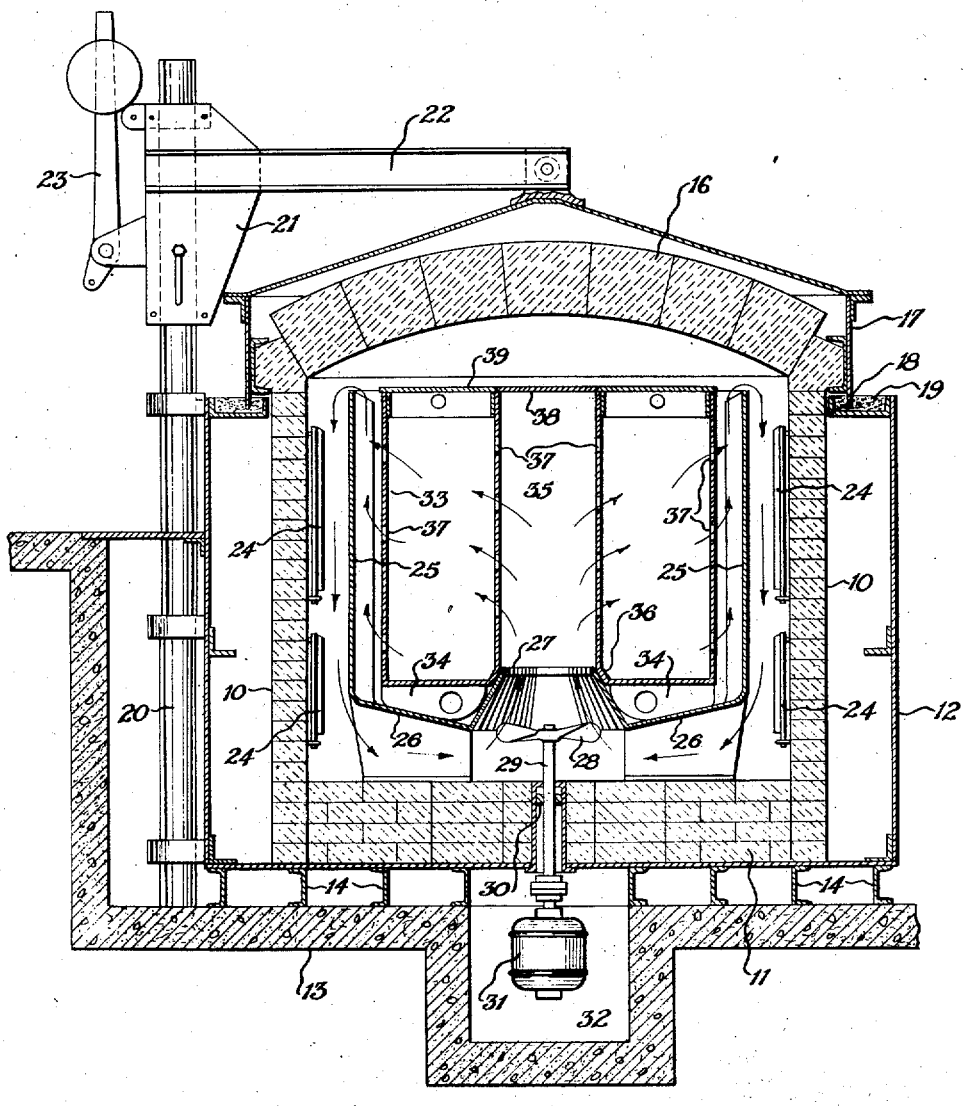
Inventor
Frank T. Cope
By Harry Grease
Attorney Reissued Nov. 29, 1932 Re. 18,668

UNITED STATES PATENT OFFICE

FRANK T. COPE, OF SALEM, OHIO, ASSIGNOR TO THE ELECTRIC FURNACE COMPANY, OF SALEM, OHIO, A CORPORATION OF OHIO

HEAT TREATING FURNACE

Original No. 1,794,151, dated February 24, 1931, Serial No. 397,017, filed October 3, 1929. Application for reissue filed December 17, 1931. Serial No. 581,764.

The invention relates to heat treating furnaces of that type in which the work to be heated is supported in a hollow or tubular mass within the furnace, hot air being circulated within the hollow mass of work and then outward through the same.

An object of the improvement is to provide a furnace chamber having heating means at its sides, and a baffle wall spaced from the heating means and from the top and bottom of the chamber, means being provided for supporting a hollow or tubular mass of work inside of the baffle walls, and means, such as a fan, being provided for circulating air between the heating means and baffle walls, then into the interior of the hollow or tubular mass of work and then outward through the work, this circulation of air being preferably continuous.

Another object of the improvement is to provide a furnace especially adapted for the heat treatment of small articles which are placed in the furnace in a container or receptacle sealed at both ends, a baffle wall being located between the heating means and the container, and a perforate pressure chamber being located within the receptacle and provided with a fan or the like for continually forcing heated air through the container, the air within the furnace chamber as it is cooled passing downward past the heating means where it is reheated and again circulated upward through the container.

An embodiment of the invention is illustrated in the accompanying drawing, in which The figure is a vertical sectional view through a furnace constructed in accordance with the invention.

Similar numerals refer to similar parts throughout the drawing.

The furnace may be of any usual and well known construction, comprising the side walls 10 and bottom wall 11 formed of suitable refractory material and enclosed in the metallic shell 12, the entire structure being preferably supported spaced above the floor 13 as by the channel irons 14.

The furnace is preferably provided with a removable roof or crown 16 of suitable refractory material enclosed in the metal shell or frame 17 and preferably provided with the depending flange 18 for normal entrance into the sand sealing channel 19 carried at the upper open end of the furnace proper.

For the purpose of easily removing and replacing the roof or crown, a vertical post 20 may be supported at one side of the furnace and have mounted thereon the sliding bracket 21 provided with the horizontal arm 22 connected to the central portion of the roof frame or shell.

A weighted lever 23 may be provided for counterbalancing the weight of the roof when the same is raised and moved from over the furnace chamber.

Any suitable heating means, such as the electric resistors 24, may be provided around the inner walls of the furnace chamber or elsewhere in the path of the fluid, as will be later described. Baffle walls 25 are located within the furnace chamber and spaced a slight distance from the heating elements.

These baffle walls terminate at their upper ends near the upper end of the furnace chamber, the lower ends thereof being extended toward the center of the furnace as at 26 and terminating in a hollow frustum 27.

A fan 28 is located at the base of the frustum, being mounted on the vertical shaft 29 journaled through a suitable bearing 30, in the bottom wall of the furnace, and driven by any suitable means, such as the motor 31 which may be located within a pit 32 in the floor.

The container or basket, which receives the articles to be heat treated, is adapted to be placed within the baffle walls 25 and rest upon the horizontal portions 26 thereof and is indicated generally at 33, being preferably provided at its lower end with the depending flanges or fins 34 for contact upon the horizontal walls 26.

This container is preferably provided with the central pressure chamber 35 which may be slightly coned at its lower end as at 36, whereby the container may be easily centered upon the frustum 27.

Openings 37 are formed in the side walls and pressure chamber of the container, the upper end of the tube being closed as by the wall 38 and a removable cover 39 being provided for closing the body portion of the container.

In operating the furnace, the articles to be heat treated are placed within the container 33 and the roof of the furnace is then raised and moved to one side, permitting the container to be lowered into place as shown in the drawing.

The roof is then replaced upon the furnace and the fan 28 operated, circulating the air in the direction of the arrows shown in the drawing, the hot air passing upward through the frustum 27 and into the pressure chamber 35, passing through the openings therein and through the container and then out through the openings of the container and upward over the baffle wall 25.

As the air cools it descends past the heating elements 24 where it is reheated and again circulated through the pressure chamber and container. It will be seen that this tends to maintain an even temperature in the articles in all parts of the container, thus giving each article substantially the same heat treatment as all of the other articles in the furnace.

This device also conserves the heat as the heated air is continually being drawn away from the heating elements and forced directly onto the articles to be treated.

I claim:

1. A furnace including a chamber, heating means at the sides of the chamber, baffle walls spaced from the heating means and from the bottom of the chamber, and terminating near the top of the chamber, a basket provided with perforated side walls for holding material within the baffle walls, and means for circulating air upward into the basket and out through the perforated side walls and downward between the heating means and baffle walls.

2. A furnace including a chamber, heating means at the sides of the chamber, baffle walls spaced from the heating means and from the bottom of the chamber, and terminating near the top of the chamber, a basket provided with perforated side walls for holding material within the baffle walls, and a fan in the chamber for circulating air upward into the basket and out through the perforated side walls and downward between the heating means and baffle walls.

3. A furnace including a chamber, heating means at the sides of the chamber, baffle walls spaced from the heating means and from the bottom of the chamber, and terminating near the top of the chamber, a basket provided with perforated side walls for holding material within the baffle walls, and a fan in the bottom of the chamber for circulating air upward into the basket and out through the perforated side walls and downward between the heating means and baffle walls.

4. A furnace including a chamber, heating means at the sides of the chamber, baffle walls spaced from the heating means and from the bottom of the chamber and extending inwardly adjacent the bottom of the chamber, and terminating near the top of the chamber, a hollow frustum at the inner termination of the baffle walls, a perforate basket for holding material within the baffle walls, said basket having a central, perforate pressure chamber adapted to register with said hollow frustum, a cover for the top of the basket, and means for circulating air upward through the hollow frustum and pressure chamber, through the basket, and downward between the heating means and baffle walls.

5. A furnace including a chamber, heating means at the sides of the chamber, baffle walls spaced from the heating means and from the bottom of the chamber and extending inwardly adjacent the bottom of the chamber, and terminating near the top of the chamber, a hollow frustum at the inner termination of the baffle walls, a perforate basket for holding material within the baffle walls, said basket having a central, perforate pressure chamber adapted to register with said hollow frustum, a cover for the top of the basket, and a fan at the bottom of the hollow frustum for circulating air upward through the hollow frustum and perforate pressure chamber, through the basket, and downward between the heating means and baffle walls.

6. A furnace including a heating chamber, baffle walls spaced from the side walls of the heating chamber and from the top and bottom of the chamber, a material receptacle having a perforate outer wall spaced from the baffle walls, a pressure chamber within the receptacle and having a perforate wall, the top and bottom of the receptacle being sealed whereby fluid from the pressure chamber must pass through the material in the receptacle, heating means located in the path of the fluid, and means for circulating air upward through the pressure chamber.

7. A furnace including a chamber, heating means at the sides of the chamber, baffle walls spaced from the heating means and from the bottom of the chamber and extending inwardly adjacent the bottom of the chamber, said baffle walls terminating near the top of the chamber, an air inlet at the inner termination of the baffle walls, a basket for holding material within the baffle walls and provided with perforated side walls, said basket having a central, perforate pressure chamber adapted to register with said air inlet, a cover for the top of the basket, and means for circulating air upward through the air inlet, outward through the perforate pressure chamber into and through the basket, outward through the perforated side walls of the basket, and downward between the heating means and baffle walls.

8. A furnace including a chamber, heating means at the sides of the chamber, baffle walls spaced from the heating means and from the top and bottom of the chamber, means for supporting work in the chamber within the baffle walls, there being a central chamber defined by said work supporting means, and means for forcing a current of air to flow from behind the baffle walls into said central chamber and for causing said current of air to escape from the central chamber through the work.

9. A furnace including a chamber, heating means at the sides of the chamber, baffle walls spaced from the heating means and from the bottom of the chamber and terminating near the top of the chamber, means for supporting a tubular mass of work within the baffle walls, means for circulating air within said tubular mass of work, and closure means at the ends of the tubular mass of work for causing said air to escape laterally out through the work and between the heating means and baffle walls.

10. A furnace including a chamber, heating means at the sides of the chamber, baffle walls spaced from the heating means and from the bottom of the chamber and terminating near the top of the chamber, means for supporting a tubular mass of work within the baffle walls, means for circulating air upward within said tubular mass of work, and closure means at the ends of the tubular mass of work for causing said air to escape laterally out through the work, and downward between the heating means and baffle walls.

11. A furnace including a chamber, heating means at the sides of the chamber, baffle walls spaced from the heating means and from the top and bottom of the chamber, means for supporting a tubular mass of work within the baffle walls, a perforate tubular wall within the tubular mass of material, and means for circulating air within said perforate wall and laterally out through the material and between the heating means and baffle walls.

12. A furnace including a chamber, heating means at the sides of the chamber, baffle walls spaced from the heating means and from the top and bottom of the chamber, means for supporting work in the chamber within the baffle walls, a central chamber within the work, means for forcing a current of air to flow behind the said baffles into one end of said central chamber, a closure for the opposite end of the central chamber, and a closure for the upper end of the work whereby said air current is caused to escape laterally from the central chamber through the work.

FRANK T. COPE.